US012799870B2

(12) United States Patent
Morton

(10) Patent No.: US 12,799,870 B2
(45) Date of Patent: Nov. 17, 2026

(54) TURBINE VANE BAFFLE CHIMNEY

(71) Applicant: Raytheon Technologies Corporation, Farmington, CT (US)

(72) Inventor: Jeffrey T. Morton, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 37 days.

(21) Appl. No.: 18/331,124

(22) Filed: Jun. 7, 2023

(65) Prior Publication Data

US 2024/0410284 A1 Dec. 12, 2024

(51) Int. Cl.
*F01D 5/18* (2006.01)
*F01D 9/04* (2006.01)
*F01D 9/06* (2006.01)

(52) U.S. Cl.
CPC ............. *F01D 5/189* (2013.01); *F01D 9/041* (2013.01); *F01D 9/065* (2013.01); *F05D 2240/81* (2013.01)

(58) Field of Classification Search
CPC .......... F01D 5/189; F01D 9/041; F01D 9/065; F05D 2240/81
See application file for complete search history.

(56) References Cited

U.S. PATENT DOCUMENTS 3,858,290 A 1/1975 Albani
4,288,201 A * 9/1981 Wilson .................... F01D 5/189 415/115
5,207,556 A 5/1993 Frederick et al.
5,630,700 A * 5/1997 Olsen ...................... F01D 9/042 415/209.2
6,382,906 B1 * 5/2002 Brassfield ............... F01D 5/187 415/115
7,008,185 B2 3/2006 Peterman et al.
10,415,428 B2 9/2019 Spangler et al.
2013/0177384 A1 * 7/2013 Coign ..................... F01D 9/065 415/115
2018/0230836 A1 8/2018 Tibbott et al.
2019/0234236 A1 * 8/2019 Spangler .................. F02C 3/06

OTHER PUBLICATIONS

Extended European Search Report dated Nov. 5, 2024, for corresponding European Patent Application No. 24180780.9, 7 pgs.

* cited by examiner

*Primary Examiner* — Chelsea E Stinson
*Assistant Examiner* — Eric A Lange
(74) *Attorney, Agent, or Firm* — Kinney & Lange, P.A.

(57) ABSTRACT

A turbine vane includes an airfoil section with an airfoil wall defining a leading edge and a trailing edge. A first side extends from the leading edge to the trailing edge and extends from a first end of the airfoil section to a second end of the airfoil section. A second side extends from the leading edge to the trailing edge and extends from the first end to the second end of the airfoil section. The airfoil wall also circumscribes an internal core cavity. A platform is attached to the first end of the airfoil section and a platform cavity is formed in the platform. A baffle is in the internal core cavity and includes a baffle tube extending from a first tube end to a second tube end. A chimney is connected to the first tube end and extends completely through the platform cavity.

17 Claims, 6 Drawing Sheets

TURBINE VANE BAFFLE CHIMNEY

BACKGROUND

The present disclosure relates to gas turbine engines, and in particular, to turbine vanes.

A gas turbine engine typically includes a fan section, a compressor section, a combustor section and a turbine section. Air entering the compressor section is compressed and delivered into the combustion section where it is mixed with fuel and ignited to generate a hot and high-speed exhaust gas flow. The high-speed exhaust gas flow expands through the turbine section to drive the compressor and the fan section.

The turbine section includes turbine vanes to guide and direct the high-speed exhaust gas flow across turbine rotor blades in the turbine section. To withstand the high temperatures of the high-speed exhaust gas flow, the turbine vanes and turbine blades require cooling. Cooling air for cooling the turbine vanes and the turbine blades is generally bled from the compressor section and directed to the turbine vanes and the turbine blades. Various cooling schemes have been proposed to optimize the cooling of the turbine vanes and the turbine vanes.

SUMMARY

A turbine vane includes an airfoil section with an airfoil wall defining a leading edge and a trailing edge. A first side extends from the leading edge to the trailing edge and extends from a first end of the airfoil section to a second end of the airfoil section. A second side extends from the leading edge to the trailing edge and extends from the first end to the second end of the airfoil section. The airfoil wall also circumscribes an internal core cavity. A platform is attached to the first end of the airfoil section and a platform cavity is formed in the platform. A baffle is in the internal core cavity and includes a baffle tube extending from a first tube end to a second tube end. A chimney is connected to the first tube end and extends completely through the platform cavity.

A turbine vane for a gas turbine engine includes an airfoil section with an airfoil wall defining a leading edge and a trailing edge. A first side extends from the leading edge to the trailing edge and extends from a radially inner end of the airfoil section to a radially outer end of the airfoil section relative to a center line of the gas turbine engine. A second side extends from the leading edge to the trailing edge and extends from the radially inner end to the radially outer end of the airfoil section. The airfoil wall circumscribes an internal core cavity. An outer platform is attached to the radially outer end of the airfoil section and a platform cavity is formed in the outer platform. A cover plate covers the platform cavity and includes impingement holes. A baffle is in the internal core cavity and includes a baffle tube extending within the internal core cavity. A chimney extends from the baffle tube and extends completely through the platform cavity and the cover plate.

A turbine vane includes an airfoil section with an airfoil wall defining a leading edge and a trailing edge. A pressure side extends from the leading edge to the trailing edge and extends from a first end of the airfoil section to a second end of the airfoil section. A suction side extends from the leading edge to the trailing edge and extends from the first end to the second end of the airfoil section. The airfoil wall circumscribes an internal core cavity. A platform is attached to the first end of the airfoil section and an impingement cavity is formed in the platform. A cover plate covers the impingement cavity and includes impingement holes extending through the cover plate. A baffle is in the internal core cavity and includes a baffle tube extending in the internal core cavity and a chimney extending from the baffle tube and through the cover plate.

The present summary is provided only by way of example, and not limitation. Other aspects of the present disclosure will be appreciated in view of the entirety of the present disclosure, including the entire text, claims and accompanying figures.

Figure 1:
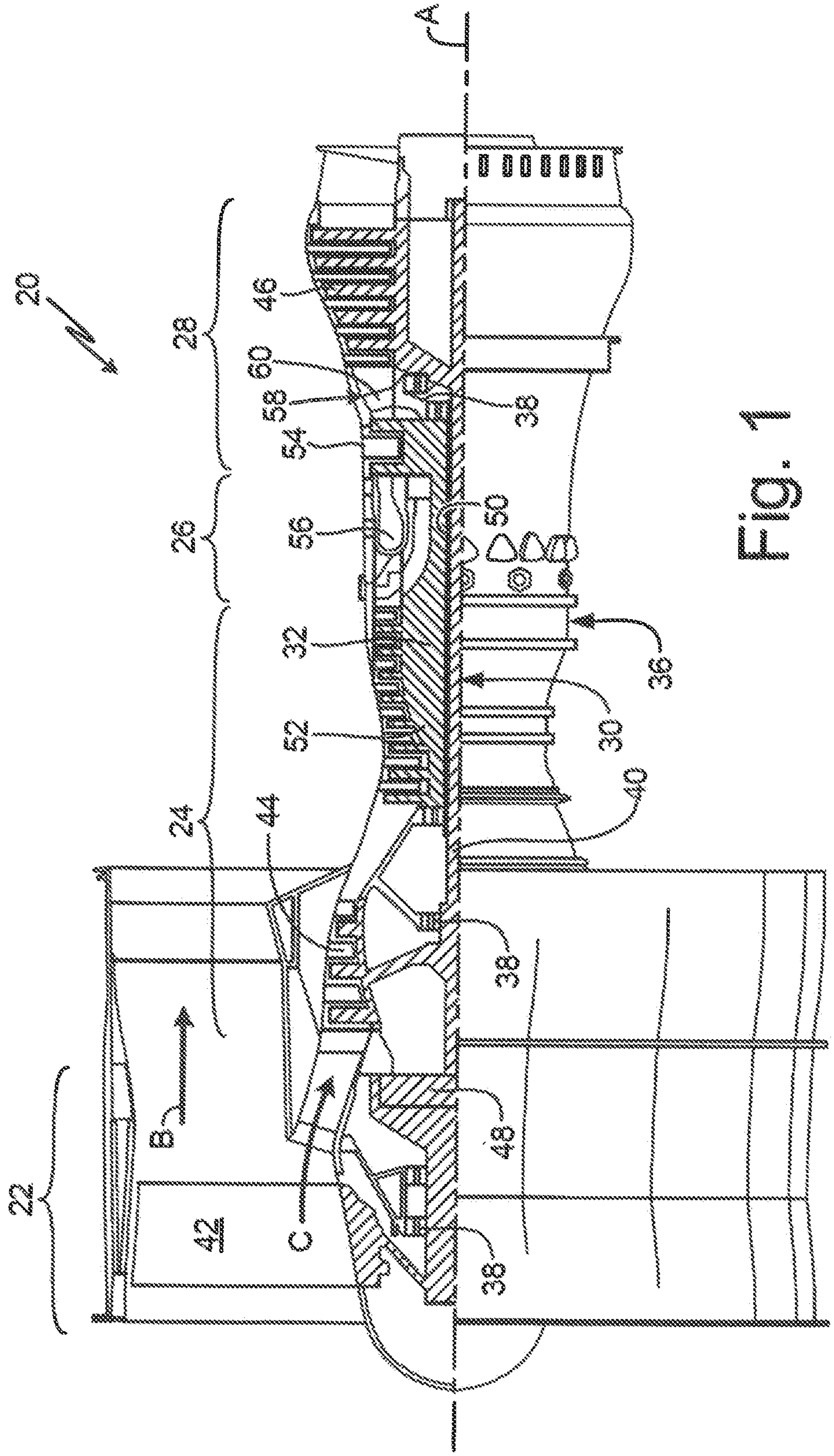
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to a turbine vane with an impingement cavity in a platform of the of the vane, a cover on the impingement cavity, a baffle inside an internal cavity of an airfoil of the turbine vane, and a chimney extending from the baffle and through the cover of the impingement cavity. The chimney allows cooling air to enter the baffle without adversely impacting cooling air flow and impingement inside of the impingement cavity. The turbine vane is discussed below with reference to the figures.

FIG. 1 is a quarter-sectional view that schematically illustrates example gas turbine engine 20 that includes fan section 22, compressor section 24, combustor section 26 and turbine section 28. Fan section 22 drives air along bypass flowpath B while compressor section 24 draws air in along core flowpath C where air is compressed and communicated to combustor section 26. In combustor section 26, air is mixed with fuel and ignited to generate a high-pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low-pressure (or first) compressor section 44 to low-pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high-pressure (or second) compressor section 52 and high-pressure (or second) turbine section 54. Inner shaft 40 and outer shaft 50 are concentric and rotate via bearing systems 38 about center axis A.

Combustor 56 is arranged between high-pressure compressor 52 and high-pressure turbine section 54. In one example, high-pressure turbine section 54 includes at least two stages to provide double stage high-pressure turbine section 54. In another example, high-pressure turbine section 54 includes only a single stage. As used herein, a "high-pressure" compressor or turbine experiences a higher pressure than a corresponding "low-pressure" compressor or turbine. The example low-pressure turbine section 46 has a pressure ratio that is greater than about 5. The pressure ratio of the example low-pressure turbine section 46 is measured prior to an inlet of low-pressure turbine section 46 as related to the pressure measured at the outlet of low-pressure turbine section 46 prior to an exhaust nozzle.

Mid-turbine frame 58 of engine static structure 36 can be arranged generally between high-pressure turbine section 54 and low-pressure turbine section 46. Mid-turbine frame 58 further supports bearing systems 38 in turbine section 28 as well as setting airflow entering the low-pressure turbine section 46. Mid-turbine frame 58 includes vanes 60, which are in the core flowpath and function as inlet guide vanes for low-pressure turbine section 46.

The gas flow in core flowpath C is compressed first by low-pressure compressor 44 and then by high-pressure compressor 52. The gas flow in core flowpath C is then mixed with fuel and ignited in combustor 56 to produce high speed exhaust gases that are then expanded through high-pressure turbine section 54 and low-pressure turbine section 46. As discussed below with reference to FIGS. 2-4, high-pressure turbine section 54 and low-pressure turbine section 46 include turbine vanes to guide the gas flow through high-pressure turbine section 54 and low-pressure turbine section 46.

Figure 2:
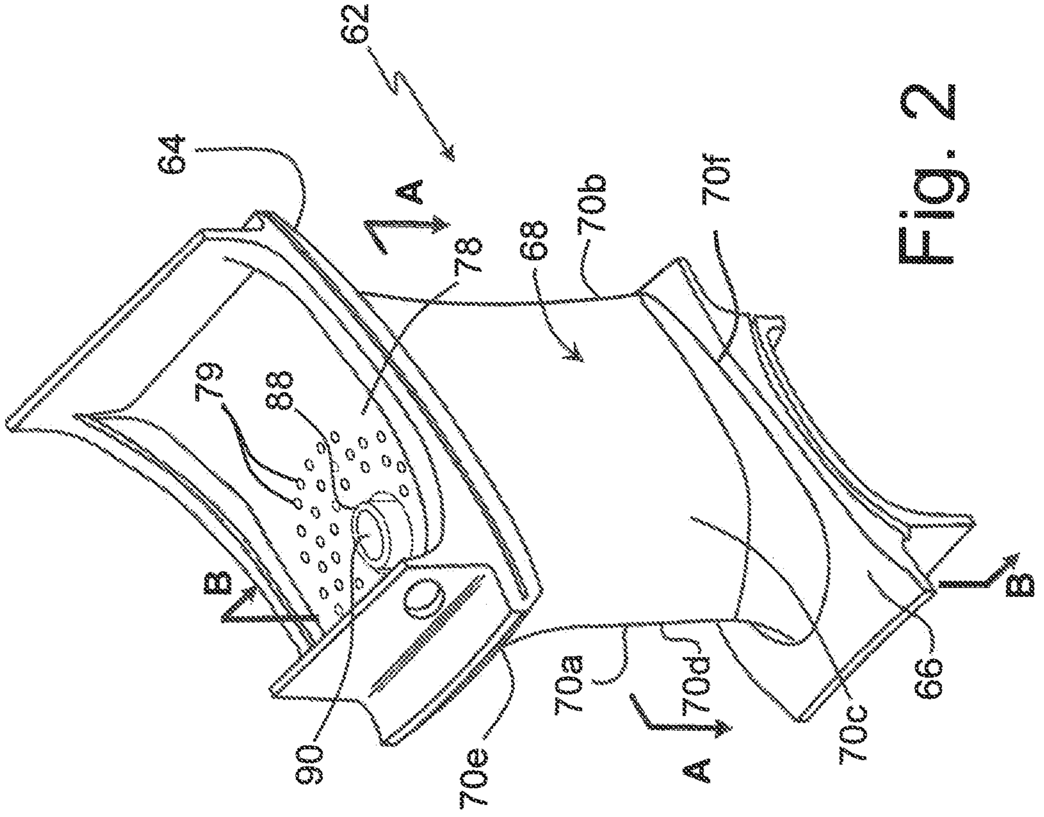
FIG. 2 is a perspective view of a turbine vane.
Figure 3:
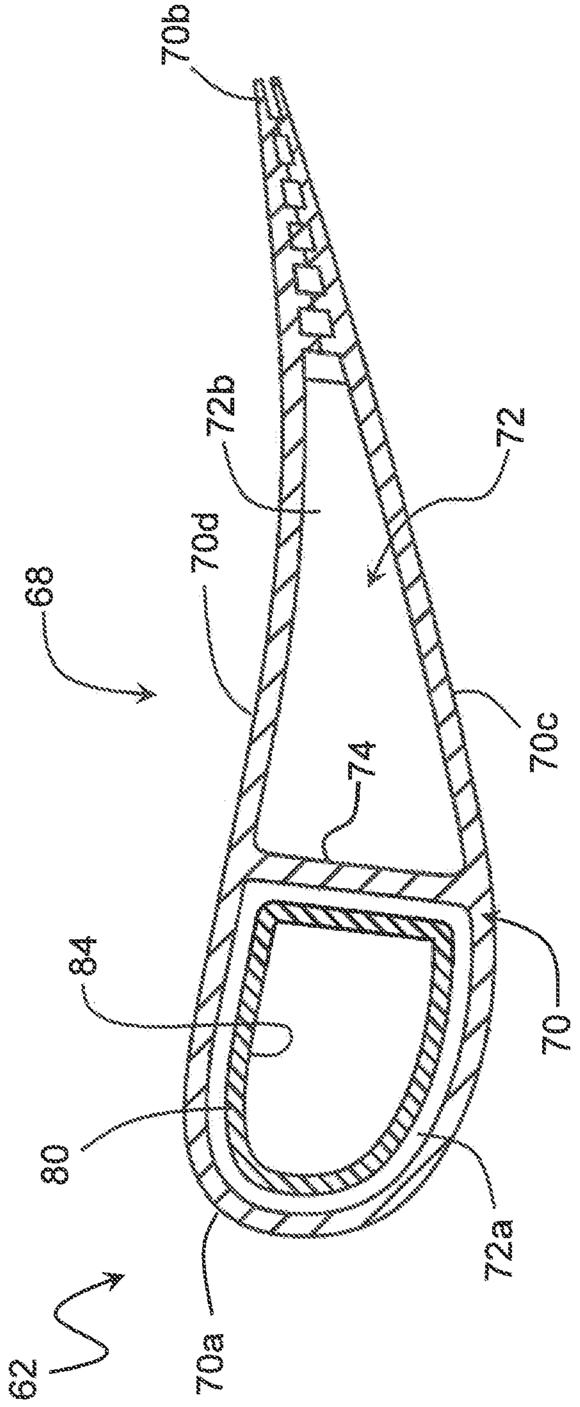
FIG. 3 is a cross-sectional view of the turbine vane of FIG. 2 taken along line A-A.
Figure 4:
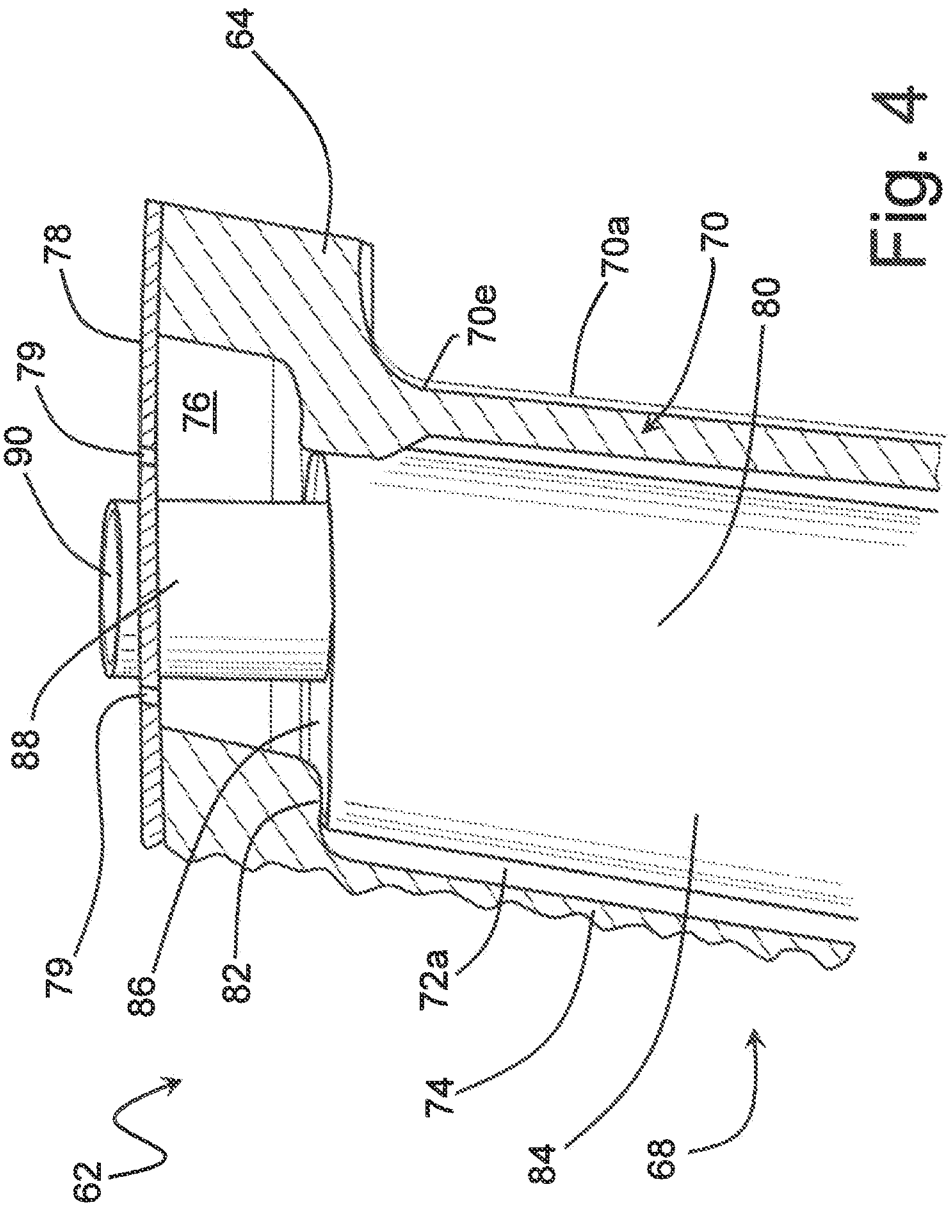
FIG. 4 is a partial cross-sectional view of the turbine vane of FIG. 2 taken along line B-B.

FIGS. 2-4 will be discussed concurrently. FIG. 2 illustrates a representative example of turbine vane 62 used in high-pressure turbine section 54 or low-pressure turbine section 46 of gas turbine engine 20 from FIG. 1. FIG. 3 is a cross-sectional view of turbine vane 62 taken along line A-A from FIG. 2. FIG. 4 is partial cross-sectional view of turbine vane 62 taken along line B-B from FIG. 2. As shown in FIGS. 2-4, turbine vane 62 includes outer platform 64, inner platform 66, and airfoil section 68. Airfoil section 68 includes airfoil outer wall 70, which forms leading edge 70*a*, trailing edge 70*b*, first side 70*c*, second side 70*d*, first end 70*e*, and second end 70*f*. As shown best in FIG. 3, airfoil section 68 also includes internal core cavity 72 and rib 74 dividing internal core cavity 72 into forward core cavity 72*a* and aft core cavity 72*b*. As shown best in FIG. 4, turbine vane 62 also includes platform cavity 76, impingement cover 78 with impingement holes 79, baffle 80, and baffle stop 82. Baffle 80 includes baffle tube 84, baffle cap 86, and chimney 88 with passage 90.

Airfoil section 68 extends radially outward from inner platform 66 to outer platform 64 relative to center axis A of gas turbine engine 20. Terms such as "radially," "axially," or variations thereof are used herein to designate directionality with respect to center axis A of gas turbine engine 20. Airfoil outer wall 70 of airfoil section 68 delimits the profile of airfoil section 68. Airfoil outer wall 70 defines leading edge 70*a*, trailing edge 70*b*, and first and second sides 70*c*/70*d* that join leading and trailing edges 70*a*/70*b*. First and second sides 70*c*/70*d* span in the radial direction between first and second ends 70*e*/70*f*. First and second ends 70*e*/70*f* are attached, respectively, to outer and inner platforms 64/66. In this example, first side 70*c* is a suction side and the second side 70*d* is a pressure side.

As shown in FIG. 3, airfoil outer wall 70 circumscribes internal core cavity 72 and partially defines airfoil section 68. In this example, airfoil section 68 includes rib 74 that extends from first side 70*c* to the second side 70*d* and partitions internal core cavity 72 into forward core cavity 72*a* and aft core cavity 72*b*. Forward core cavity 72*a* extends inside of airfoil section 68 from inner platform 66 to platform cavity 76 in outer platform 64. As shown in FIG. 4, platform cavity 76 is an impingement cavity formed in outer platform 64, and impingement cover 78 is a cover plate radially outward from platform cavity 76 and is positioned over platform cavity 76 to cover platform cavity 76. Impingement holes 79 extend completely through impingement cover 78 to fluidically connect to platform cavity 76.

Baffle 80 is disposed in internal core cavity 72. In the example of FIGS. 2-4, baffle 80 is disposed in forward core cavity 72*a*. As shown best in FIG. 4, baffle tube 84 of baffle 80 extends inside forward core cavity 72*a* from inner platform 66 to outer platform 64. A first tube end of baffle tube 84 is a radially outer end of baffle tube 84 that is at or near outer platform 64. A second tube end of baffle tube 84 is at or near inner platform 66. Baffle cap 86 is connected to the radially outer end of baffle tube 84 to close the radially outer end of baffle tube 84. Baffle stop 82 is a shelf or protrusion formed between forward core cavity 72*a* and platform cavity 76. The radially outer end of baffle tube 84 and baffle cap 86 can be flat and abut against baffle stop 82 to prevent baffle tube 84 from extending into platform cavity 76. The radially outer end of baffle tube 84 and baffle cap 86 block and separate forward core cavity 72*a* from platform cavity 76. Chimney 88 extends radially outward from baffle cap 86 through platform cavity 76 and through impingement cover 78. Passage 90 of chimney 88 is fluidically connected with an interior of baffle tube 84 such that cooling air can be directed radially inward into baffle 80 through chimney 88.

During operation, cooling air, such as bleed air from compressor section 24, is directed to inner platform 66 and outer platform 64. The cooling air directed to outer platform 64 is metered through impingement holes 79 of impingement cover 78 before passing into platform cavity 76 to impinge upon an interior surface of outer platform 64. Impingement cover 78 and impingement holes 79 help distribute the cooling air to the portions of outer platform 64 that require the most cooling, such as the forward portions of outer platform 64.

A portion of the cooling air directed to outer platform 64 from compressor section 24 passes radially inward through passage 90 of chimney 88 and into baffle tube 84 of baffle 80. Chimney 88 allows the portion of the cooling air to enter baffle 80 without adversely impacting the cooling air that is impinging inside of platform cavity 76. Baffle 80 distributes the cooling air entering baffle 80 to cool outer wall 70 at and near leading edge 70*a*. For instance, baffle 80 may include cooling holes (not shown in FIG. 4) in baffle tube 84 that direct the cooling air flow inside baffle 80 to flow out and into forward core cavity 72*a* and impinge on the inside surface of outer wall 70 for cooling of leading edge 70*a*. In addition to receiving cooling air through chimney 88, cooling air from compressor section 24 can be directed to inner platform 66 and into baffle 80 through a radially inner end of baffle tube 84. Baffle tube 84, baffle cap 86, and chimney 88 can be formed separately from metal or composite and assembled together. In other examples, baffle tube 84, baffle cap 86, and chimney 88 can be additively manufactured as a single component. The geometry of the baffle tube 84, baffle cap 86, and/or chimney 88 could be optimized for better cooling effectiveness, lower pressure loss and/or manufacturability depending on the actual manufacturing technique utilized.

Figure 5A:
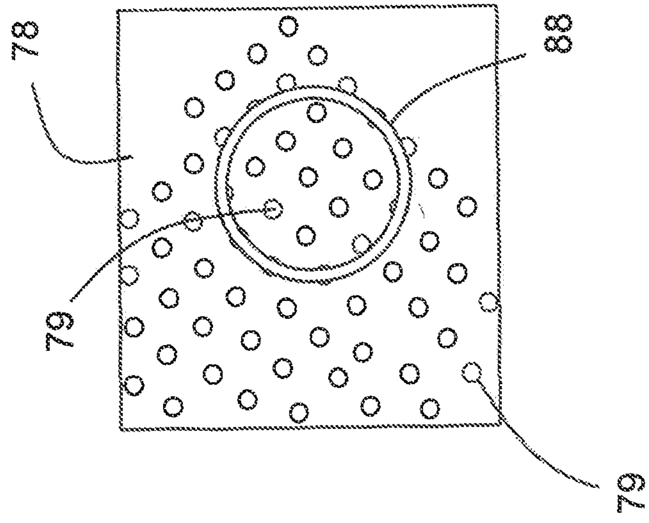
FIG. 5A shows a first step of fitting a baffle chimney through an impingement cover of a turbine vane.
Figure 5B:
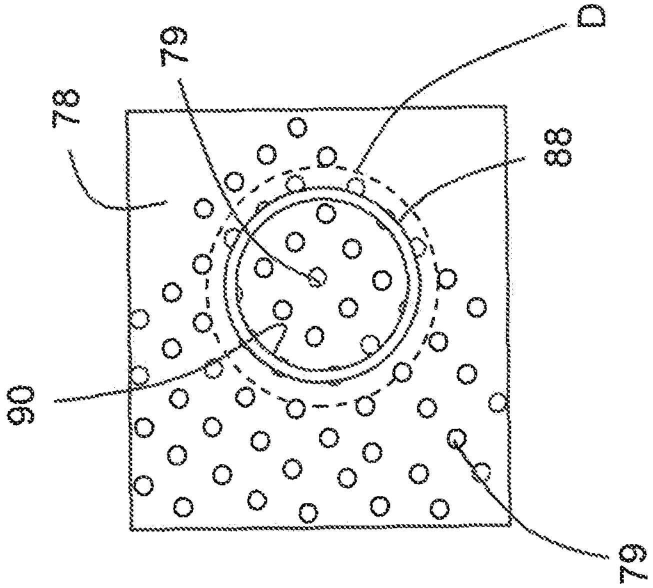
FIG. 5B shows a second step of fitting a baffle chimney through an impingement cover of a turbine vane.
Figure 5C:
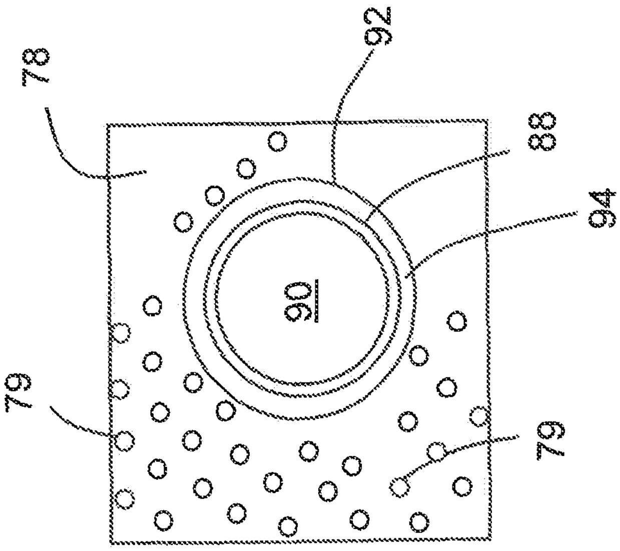
FIG. 5C shows a third step of fitting a baffle chimney through an impingement cover of a turbine vane.

FIGS. 5A-5C show a process for fitting and adjusting impingent cover 78 of turbine vane 62 from FIGS. 2-4 to accommodate chimney 88. Chimney hole 92 is a hole that is cut into impingement cover 78 to allow chimney 88 to pass through impingement cover 78. FIG. 5A shows a top view of impingement cover 78 with impingement holes 79 laid out as if a baffle chimney 88 was not included in the design, as well as baffle chimney 88. The number, size, and pattern of impingement holes 79 needed in impingement cover 78 to provide sufficient impingement flow into platform cavity 76 is first determined. The profile of chimney 88 and passage 90 is then superimposed onto impingement cover 78, and the area of impingement holes 79 inside of chimney 88 and within a region offset from the profile of chimney 88 is measured. The size of the offset area is determined by manufacturing and/or impingement cover 78 structural limitations associated with minimum spacing between holes in impingement cover 78. The minimum size of chimney hole 92 is determined by adding the area of the profile of chimney 88 with the area of the impingement holes 79 inside of the region offset from the profile of chimney 88. The actual area of chimney hole 92 may be larger than the minimum area of chimney hole 92 if manufacturing and/or assembly tolerances of baffle 80, chimney 88 or impingement cover 78 dictates so. Dashed line D in FIG. 5B indicates the size of chimney hole 92 needed in impingement cover 78 to accommodate chimney 88. Adding the area of the impingement holes 79 inside of chimney 88 and any additional area need to compensate for manufacturing and/or assembly tolerances of baffle 80, chimney 88 and impingement cover 78 will cause annular gap 94 to be formed between chimney 88 and impingement cover 78. Gap 94 allows leakage flow to occur into platform cavity 76 between chimney 88 and impingement cover 78. The leakage flow through gap 94 compensates for the flow that would have occurred through those impingement holes 79 that were removed from impingement cover 78 to accommodate chimney 88. By adding gap 94 between chimney 88 and impingement cover 78, the additional cooling flow that passes through impingement cover 78 to impinge in platform cavity 76 is minimized with the addition of chimney 88 to turbine vane 62 and the cooling performance of the cooling air flowing through impingement holes 79 is maintained. While chimney 88 is shown in FIGS. 5A-5C as a cylindrical tube, chimney 88 and passage 90 can have a non-cylindrical tube profile as depicted in FIGS. 6A-6C.

Figure 6C:
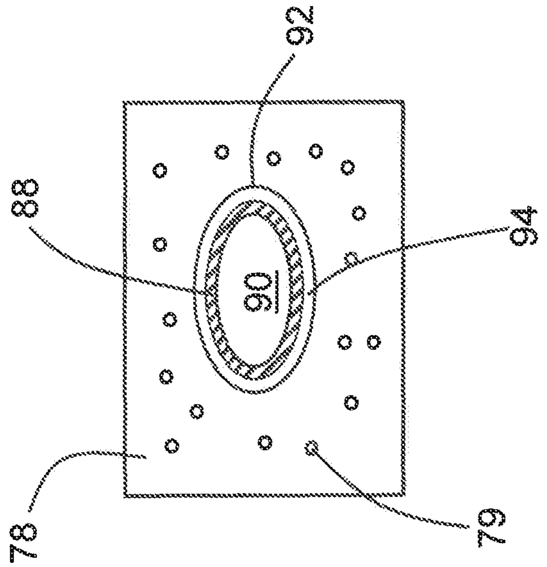
FIG. 6C shows a baffle chimney with an oval-shaped profile extending through an impingement cover of a turbine vane.
Figure 6B:
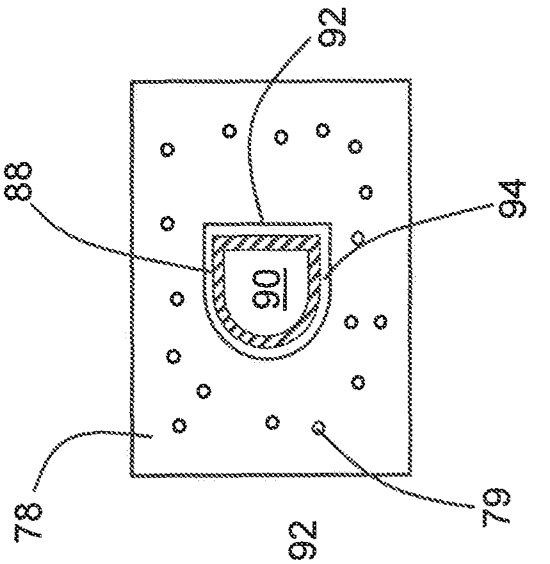
FIG. 6B shows a baffle chimney with a D-shaped profile extending through an impingement cover of a turbine vane.
Figure 6A:
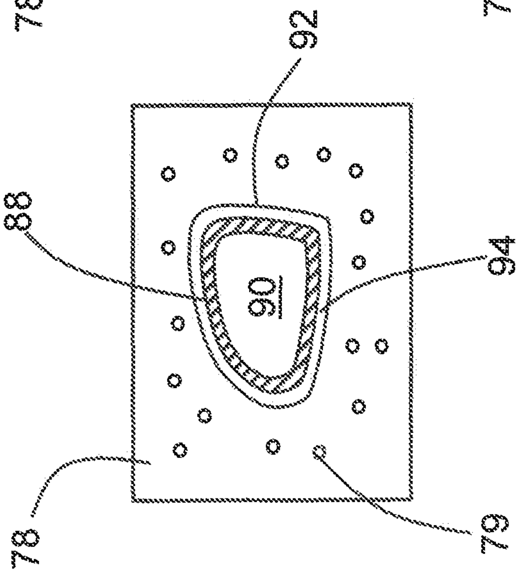
FIG. 6A shows a baffle chimney with an airfoil-shaped profile extending through an impingement cover of a turbine vane.

FIGS. 6A-6C show alternative examples of chimney 88 that are non-cylindrical tubes. FIG. 6A shows an example of chimney 88 with an airfoil-shaped profile that matches at least a portion (in this case a leading-edge portion) of the profile of airfoil section 68 from FIGS. 2 and 3. FIG. 6B shows an example of chimney 88 with a D-shaped profile extending through impingement cover 78. FIG. 6C shows an example of chimney 88 with an oval-shaped profile extending through impingement cover 78. Chimney shapes other than round can optionally be used to balance the desired flow area of passage 90 with packaging constraints and/or manufacturability of baffle 80, chimney 88 or impingement cover 78.

Discussion of Possible Embodiments

The following are non-exclusive descriptions of possible embodiments of the present invention.

In one example, a turbine vane includes an airfoil section with an airfoil wall defining a leading edge and a trailing edge. A first side extends from the leading edge to the trailing edge and extends from a first end of the airfoil section to a second end of the airfoil section. A second side extends from the leading edge to the trailing edge and extends from the first end to the second end of the airfoil section. The airfoil wall also circumscribes an internal core cavity. A platform is attached to the first end of the airfoil section and a platform cavity is formed in the platform. A baffle is in the internal core cavity and includes a baffle tube extending from a first tube end to a second tube end. A chimney is connected to the first tube end and extends completely through the platform cavity.

The turbine vane of the preceding paragraph can optionally include, additionally and/or alternatively, any one or more of the following features, configurations and/or additional components:

- a cover plate covering the platform cavity such that the platform cavity is between the airfoil section and the cover plate; and impingement holes extending through the cover plate, and wherein the chimney extends through the cover plate;
- a gap between the cover plate and the chimney;
- the baffle further includes a cap connected to the first end of the baffle tube, and wherein the chimney extends from the cap through the platform cavity and the cover plate;
- the first end of the baffle tube and the cap separate the platform cavity from the internal core cavity;
- a baffle stop formed between the platform cavity and the internal core cavity, and wherein the first end of the baffle tube and/or the cap abut the baffle stop;

the baffle stop is a shelf and/or a protrusion between the platform cavity and the internal core cavity;

the platform is an outer platform of the turbine vane; and/or the internal core cavity is adjacent to the leading edge of the airfoil section.

In another example, a turbine vane for a gas turbine engine includes an airfoil section with an airfoil wall defining a leading edge and a trailing edge. A first side extends from the leading edge to the trailing edge and extends from a radially inner end of the airfoil section to a radially outer end of the airfoil section relative to a center line of the gas turbine engine. A second side extends from the leading edge to the trailing edge and extends from the radially inner end to the radially outer end of the airfoil section. The airfoil wall circumscribes an internal core cavity. An outer platform is attached to the radially outer end of the airfoil section and a platform cavity is formed in the outer platform. A cover plate covers the platform cavity and includes impingement holes. A baffle is in the internal core cavity and includes a baffle tube extending within the internal core cavity. A chimney extends from the baffle tube and extends completely through the platform cavity and the cover plate.

The turbine vane of the preceding paragraph can optionally include, additionally and/or alternatively, any one or more of the following features, configurations and/or additional components:

the baffle further comprises: a flat cap connected to an end of the baffle tube, and wherein the chimney extends from the flat cap through the platform cavity and the cover plate;

the end of the baffle tube and the flat cap separate the platform cavity from the internal core cavity;

a baffle stop formed between the platform cavity and the internal core cavity, and wherein the end of the baffle tube and/or the flat cap abut the baffle stop; and/or an annular gap between the cover plate and the chimney.

In another example, a turbine vane includes an airfoil section with an airfoil wall defining a leading edge and a trailing edge. A pressure side extends from the leading edge to the trailing edge and extends from a first end of the airfoil section to a second end of the airfoil section. A suction side extends from the leading edge to the trailing edge and extends from the first end to the second end of the airfoil section. The airfoil wall circumscribes an internal core cavity. A platform is attached to the first end of the airfoil section and an impingement cavity is formed in the platform. A cover plate covers the impingement cavity and includes impingement holes extending through the cover plate. A baffle is in the internal core cavity and includes a baffle tube extending in the internal core cavity and a chimney extending from the baffle tube and through the cover plate.

The turbine vane of the preceding paragraph can optionally include, additionally and/or alternatively, any one or more of the following features, configurations and/or additional components:

the baffle separates the internal core cavity from the impingement cavity of the platform;

a gap extends around the chimney and between the cover plate and the chimney;

the chimney is a cylindrical tube;

a second platform connected to a second end of the airfoil section, and wherein the baffle tube extends from the platform to the second platform in the internal core cavity; and/or the baffle tube comprises cooling holes that fluidically connect the chimney with the internal core cavity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, while FIGS. 2 and 4 describe platform cavity 76 and impingement cover 78 as being at outer platform 64, in other examples platform cavity 76 can be formed in inner platform 66, impingement cover 78 can be connected to inner platform 66, and chimney 88 can extend radially inward from a radially inner end of baffle tube 84 and through impingement cover 78. Therefore, it is intended that the invention not be limited to the particular embodiment(s) disclosed, but that the invention will include all embodiments falling within the scope of the appended claims.

The invention claimed is:

1. A turbine vane comprising:

an airfoil section comprising an airfoil wall defining a leading edge, a trailing edge, a first side extending from the leading edge to the trailing edge and extending from a first end of the airfoil section to a second end of the airfoil section, a second side extending from the leading edge to the trailing edge and extending from the first end to the second end of the airfoil section, and the airfoil wall circumscribing an internal core cavity;

a platform attached to the first end of the airfoil section;

a platform cavity formed in the platform;

a cover plate covering the platform cavity such that the platform cavity is between the airfoil section and the cover plate;

a baffle in the internal core cavity, wherein the baffle comprises:

a baffle tube extending from a first tube end to a second tube end; and a chimney connected to the first tube end and extending completely through the platform cavity, and wherein the chimney extends through the cover plate; and a gap between the cover plate and the chimney, wherein the gap forms a flow path around the chimney that extends through the platform and into the platform cavity.

2. The turbine vane of claim 1, further comprising:

impingement holes extending through the cover plate.

3. The turbine vane of claim 2, wherein the baffle further comprises:

a cap connected to the first end of the baffle tube, and wherein the chimney extends from the cap through the platform cavity and the cover plate.

4. The turbine vane of claim 3, wherein the first end of the baffle tube and the cap separate the platform cavity from the internal core cavity.

5. The turbine vane of claim 4, further comprising:

a baffle stop formed between the platform cavity and the internal core cavity, and wherein the first end of the baffle tube and/or the cap abut the baffle stop.

6. The turbine vane of claim 5, wherein the baffle stop is a shelf and/or a protrusion between the platform cavity and the internal core cavity.

7. The turbine vane of claim 6, wherein the platform is an outer platform of the turbine vane.

8. The turbine vane of claim 7, wherein the internal core cavity is adjacent to the leading edge of the airfoil section.

9. A turbine vane for a gas turbine engine, wherein the turbine vane comprises:

an airfoil section comprising an airfoil wall defining a leading edge, a trailing edge, a first side extending from the leading edge to the trailing edge and extending from a radially inner end of the airfoil section to a radially outer end of the airfoil section relative to a center line of the gas turbine engine, a second side extending from the leading edge to the trailing edge and extending from the radially inner end to the radially outer end of the airfoil section, and the airfoil wall circumscribing an internal core cavity;

an outer platform attached to the radially outer end of the airfoil section;

a platform cavity formed in the outer platform;

a cover plate covering the platform cavity and comprising impingement holes;

a baffle in the internal core cavity, wherein the baffle comprises:

a baffle tube extending within the internal core cavity; and a chimney extending from the baffle tube and extending completely through the platform cavity and the cover plate; and an annular gap between the cover plate and the chimney, and wherein the annular gap forms a flow path between the cover plate and the chimney, and wherein the flow path extends across the cover plate to fluidically connect with the platform cavity.

10. The turbine vane of claim 9, wherein the baffle further comprises:

a flat cap connected to an end of the baffle tube, and wherein the chimney extends from the flat cap through the platform cavity and the cover plate.

11. The turbine vane of claim 10, wherein the end of the baffle tube and the flat cap separate the platform cavity from the internal core cavity.

12. The turbine vane of claim 11, further comprising:

a baffle stop formed between the platform cavity and the internal core cavity, and wherein the end of the baffle tube and/or the flat cap abut the baffle stop.

13. A turbine vane comprising:

an airfoil section comprising an airfoil wall defining a leading edge, a trailing edge, a pressure side extending from the leading edge to the trailing edge and extending from a first end of the airfoil section to a second end of the airfoil section, a suction side extending from the leading edge to the trailing edge and extending from the first end to the second end of the airfoil section, and the airfoil wall circumscribing an internal core cavity;

a platform attached to the first end of the airfoil section;

an impingement cavity formed in the platform; and a cover plate covering the impingement cavity and comprising impingement holes extending through the cover plate;

a baffle in the internal core cavity, wherein the baffle comprises:

a baffle tube extending in the internal core cavity; and a chimney extending from the baffle tube and through the cover plate; and a gap extending around the chimney and between the cover plate and the chimney, and wherein the gap forms a flow path that extends across the cover plate and into the impingement cavity.

14. The turbine vane of claim 13, wherein the baffle separates the internal core cavity from the impingement cavity of the platform.

15. The turbine vane of claim 14, wherein the chimney is a cylindrical tube.

16. The turbine vane of claim 14, further comprising:

a second platform connected to a second end of the airfoil section, and wherein the baffle tube extends from the platform to the second platform in the internal core cavity.

17. The turbine vane of claim 14, further comprising:

wherein the baffle tube comprises cooling holes that fluidically connect the chimney with the internal core cavity.

* * * * *